US012604266B2

(12) United States Patent
Chen et al.

(10) Patent No.: US 12,604,266 B2
(45) Date of Patent: Apr. 14, 2026

(54) TERMINAL STATE CONTROL METHOD, TERMINAL, AND NON-TRANSITORY READABLE STORAGE MEDIUM

(71) Applicant: VIVO MOBILE COMMUNICATION CO., LTD., Dongguan (CN)

(72) Inventors: Li Chen, Dongguan (CN); Xiaodong Shen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 325 days.

(21) Appl. No.: 18/229,732

(22) Filed: Aug. 3, 2023

(65) Prior Publication Data

US 2023/0379817 A1 Nov. 23, 2023

Related U.S. Application Data

(63) Continuation of application No. PCT/CN2022/076685, filed on Feb. 17, 2022.

(30) Foreign Application Priority Data

Feb. 22, 2021 (CN) ........................ 202110199866.X

(51) Int. Cl.
*H04W 52/02* (2009.01)
*H04W 76/27* (2018.01)

(52) U.S. Cl.
CPC ....... *H04W 52/0212* (2013.01); *H04W 76/27* (2018.02)

(58) Field of Classification Search
CPC . H04W 52/0212; H04W 76/27; H04W 76/28; H04W 52/0235; H04W 52/0225; Y02D 30/70
See application file for complete search history.

(56) References Cited

U.S. PATENT DOCUMENTS

| | | | |
|---|---|---|---|
| 9,407,391 B2 | 8/2016 | Jain et al. | |
| 10,924,918 B2 | 2/2021 | Au et al. | |
| 2019/0200414 A1* | 6/2019 | Abraham | H04W 76/27 |
| 2019/0357035 A1* | 11/2019 | Au | H04W 76/25 |
| 2020/0029315 A1 | 1/2020 | Lin et al. | |
| 2020/0314868 A1 | 10/2020 | Tseng et al. | |
| 2021/0051589 A1 | 2/2021 | Nam et al. | |
| 2021/0112495 A1 | 4/2021 | Liang et al. | |

(Continued)

FOREIGN PATENT DOCUMENTS

| | | |
|---|---|---|
| CN | 103200653 A | 7/2013 |
| CN | 108702307 A | 10/2018 |
| CN | 108924913 A | 11/2018 |

(Continued)

OTHER PUBLICATIONS

3GPP TSG-RAN WG1 Meeting #94bis; R1-1811281; Title: UE Power Saving Evaluation Methodology; Oct. 8-12, 2018 (Year: 2018).*

*Primary Examiner* — Mohammed S Chowdhury
(74) *Attorney, Agent, or Firm* — The Webb Law Firm

(57) ABSTRACT
A method for controlling a state of a terminal includes: triggering the terminal to enter a first state in a case that a first condition is met or a network indication is received, where power consumption of the terminal in the first state is less than power consumption of the terminal in a connected state, an idle state, or an inactive state.

16 Claims, 4 Drawing Sheets

(56)     References Cited

U.S. PATENT DOCUMENTS

2022/0353809 A1* 11/2022 Maleki .................. H04W 76/28
2023/0156594 A1*  5/2023 Li ..................... H04W 52/0212
                                                        370/311

FOREIGN PATENT DOCUMENTS

| CN | 110192415 | A  | 8/2019  |
| CN | 110557807 | A  | 12/2019 |
| CN | 110636592 | A  | 12/2019 |
| CN | 111527774 | A  | 8/2020  |
| CN | 112020872 | A  | 12/2020 |
| JP | 2015515241 | A  | 5/2015  |
| WO | 2018128442 | A1 | 7/2018  |
| WO | 2020064773 | A1 | 4/2020  |
| WO | 2020069144 | A1 | 4/2020  |

* cited by examiner

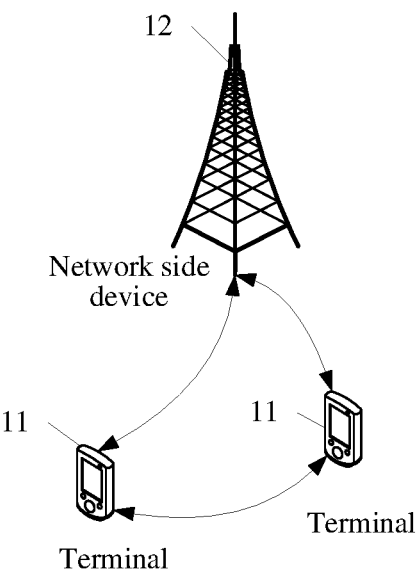

Network side
device 11                              11

Terminal

Terminal

FIG. 1

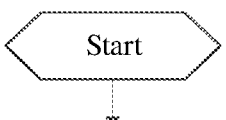

Start

Trigger a terminal to enter a first state in a case that a first
condition is met or a network indication is received, where
power consumption of the terminal in the first state is less than      201
power consumption of the terminal in a connected state, an idle
state, or an inactive state; and the first condition is determined
according to a protocol agreement, or the first condition is
determined according to a network side configuration

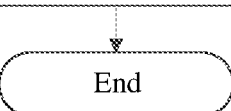

End

FIG. 2

TERMINAL STATE CONTROL METHOD, TERMINAL, AND NON-TRANSITORY READABLE STORAGE MEDIUM

CROSS-REFERENCE TO RELATED APPLICATIONS

This application is a Bypass Continuation application of International Patent Application No. PCT/CN2022/076685 filed Feb. 17, 2022, and claims priority to Chinese Patent Application No. 202110199866.X filed Feb. 22, 2021, the disclosures of which are hereby incorporated by reference in their entireties.

BACKGROUND OF THE INVENTION

Field of the Invention

This application relates to the field of communication technologies, and in particular, to a method for controlling a state of a terminal, a terminal and a non-transitory readable storage medium.

Description of Related Art

In related communication systems, different radio resource control (RRC) states of user equipment (UE) are introduced, including an idle state, a connected state, and an inactive state. A most power saving state in the foregoing RRC states is the idle state. However, some signal processing is still required when a terminal is in the idle state, and there is a certain degree of power consumption, which is not conducive to further power saving by the terminal.

SUMMARY OF THE INVENTION

According to a first aspect, a method for controlling a state of a terminal is provided, where the method includes:
triggering a terminal to enter a first state in a case that a first condition is met or a network indication is received, where
power consumption of the terminal in the first state is less than power consumption of the terminal in a connected state, an idle state, or an inactive state; and
the first condition is determined according to a protocol agreement, or the first condition is determined according to a network side configuration.
According to a second aspect, an apparatus for controlling a state of a terminal is provided, including:
a first processing module, configured to trigger a terminal to enter a first state in a case that a first condition is met or a network indication is received, where
power consumption of the terminal in the first state is less than power consumption of the terminal in a connected state, an idle state, or an inactive state; and
the first condition is determined according to a protocol agreement, or the first condition is determined according to a network side configuration.
According to a third aspect, a terminal is provided. The terminal includes a processor, a memory, and programs or instructions stored in the memory and executable on the processor, wherein when the programs or the instructions are executed by the processor, steps of the method according to the first aspect are implemented.
According to a fourth aspect, a non-transitory readable storage medium is provided. The non-transitory readable storage medium stores programs or instructions, wherein when the programs or the instructions are executed by the processor, steps of the method according to the first aspect are implemented.
According to a fifth aspect, a chip is provided. The chip includes a processor and a communication interface, where the communication interface is coupled to the processor, and the processor is configured to run a program or instructions, to implement the method according to the first aspect.
According to a sixth aspect, a computer program product is provided, where the computer program product is stored in a non-volatile storage medium and executed by at least one processor to implement the method according to the first aspect.

BRIEF DESCRIPTION OF THE DRAWINGS

FIG. 1 is a structural diagram of a communication system to which an embodiment of this application can be applied;
FIG. 2 is a schematic flowchart of a method for controlling a state of a terminal according to an embodiment of this application.

DESCRIPTION OF THE INVENTION

Figure 3:
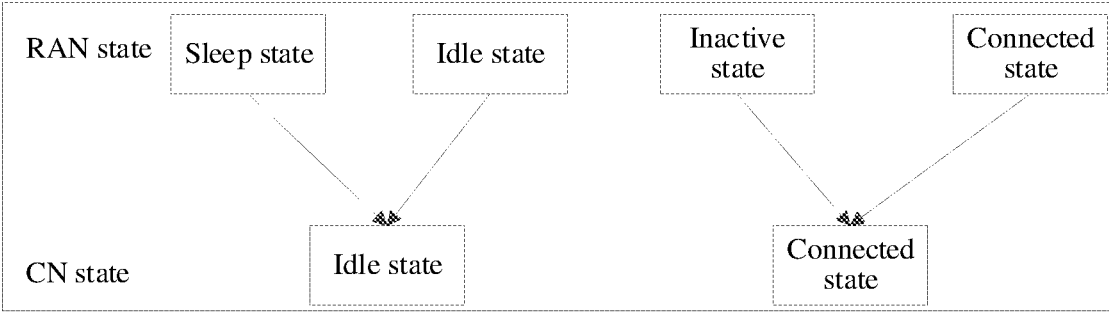
FIG. 3 is a schematic mapping diagram 1 of a first state according to an embodiment of this application.

The following clearly describes the technical solutions in embodiments of this application with reference to the accompanying drawings in embodiments of this application. Apparently, the described embodiments are some but not all of the embodiments of this application. All other embodiments obtained by a person of ordinary skill in the art based on the embodiments of this application fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" means at least one of the connected objects, and the character "I" generally indicates an "or" relationship between the associated objects.

It should be noted that, the technologies described in the embodiments of this application are not limited to a Long Term Evolution (LTE) system or an LTE-Advanced (LTE-A) system, and can also be used in other wireless communication systems, such as, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application are often used interchangeably, and the described technology can be used not only for the above systems and radio technologies, but also for other systems and radio technologies. However, the following description describes a new radio (NR) system for example objectives, and NR terms are used in most of the description below. These technologies are also applicable to applications other than NR system applications, such as a 6th generation (6G) communication system.

FIG. 1 is a block diagram of a wireless communication system to which an embodiment of this application can be applied. The wireless communication system includes a terminal 11 and a network side device 12. The terminal 11 may also be referred to as a terminal device or a user equipment (UE). The terminal 11 may be, for example, a terminal-side device such as a mobile phone, a tablet personal computer, a laptop computer, a personal digital assistant (PDA), a palmtop computer, a netbook, an ultra-mobile personal computer (UMPC), a mobile Internet device (MID), a wearable device, an in-vehicle device (VUE), or a pedestrian terminal (PUE). The wearable device includes: a bracelet, earphones, glasses, or the like. It should be noted that, a specific type of the terminal 11 is not limited the embodiments of this application. The network side device 12 may be a base station or a core network device, where the base station may be referred to as a node B, an evolution node B, an access point, a base transceiver station (BTS), a radio base station, a radio transceiver, a basic service set (BSS), an extended service set (ESS), a B node, an evolutionary B node (eNB), a household B node, a household evolutionary B node, a WLAN access point, a WiFi node, a transmitting receiving point (TRP), or some other suitable term in the field, provided that the same technical effect is achieved, the base station is not limited to a particular technical term, and it should be noted that: In the embodiments of this application, only a base station in an NR system is taken as an example, but the specific type of the base station is not limited.

In order for those skilled in the art to be able to better understand the embodiments of this application, the following description is first carried out.

1. RRC State.

A mobile phone and a network communicate with each other through a radio channel, exchanging a large amount of information with each other, so the mobile phone and the network need a control mechanism to exchange configuration information and reach an agreement, and this control mechanism is RRC, that is, radio resource control. In order to maintain a relatively fixed communication state of a terminal, different RRC states are introduced in 4G and 5G communication systems, for example, there are three states of RRC under 5G NR: an idle state, an inactive state, a connected state.

4G LTE has only two RRC states: RRC_IDLE and RRC_CONNECTED, and 5G NR introduces a new state: RRC INACTIVE.

The characteristics of the foregoing three states are as follows:

The RRC_IDLE (idle mode) corresponds to the following characteristics:

A public land mobile network (PLMN) perform a selection;

system information is broadcast;

a cell reselects mobility;

a paging of mobile termination data is initiated by a 5G Core Network (5GC);

a paging of a mobile terminal data area is managed by the 5GC; and a discontinuous reception (DRX) is configured by a non access stratum (NAS) for a core network (CN) paging.

The RRC_INACTIVE (inactive mode) corresponds to the following characteristics:

a PLMN performs a selection;

system information is broadcast;

a cell reselects mobility;

a paging is initiated by 5G NR radio access network (NG-RAN) (RAN paging);

a RAN-based notification area (RNA) is managed by the NG-RAN;

the RAN configured by the NG-RAN pages a DRX;

a 5GC-NG-RAN connection is established for a UE (including control/user surfaces);

a UE access stratum (AS) message is stored in the NG-RAN and the UE; and the NG-RAN knows the RNA to which the UE belongs.

The RRC_CONNECTED (connected mode) corresponds to the following characteristics:

a 5GC-NG-RAN connection is established for a UE (including control/user surfaces);

a UE AS message is stored in the NG-RAN and the UE;

the NG-RAN knows a cell to which the UE belongs;

unicast data is transmitted to or from the UE; and a network controls mobility, including measurement.

The above RRC states can be switched to each other.

2. Core Network State.

Connection management (CM) includes creation and release of a non access stratum (NAS) signaling connection between the UE and an access and mobility management function (AMF). The NAS signaling connection is used for NAS signaling interaction between the UE and the core network. The NAS signaling includes two connections: 1) a signaling connection between the UE and the access network (AN) (RRC connection in a 3GPP access mode, a Non-3GPP Inter Working Function (N3IWF) connection), 2) an N2 connection between the AN and the AMF.

2.1. 5GS Connection Management State (CM State).

There are two states of the signaling connection between the UE and the AMF in the 5GS:

a CM idle state (CM_IDLE); and a CM connected state (CM_CONNECTED).

The CM state is independent of each other for 3GPP access and non-3GPP access, that is, one access may be an idle state and the other is connected state at this time.

It should be noted that, in LTE, they are referred to as an evolved packet system connection management (ECM)_idle and an evolved packet system connection management (ECM_Connected) state.

2.2. CM_IDLE State.

When the UE is in the CM_IDLE state, the N2 and N3 of the terminal are not connected.

When the UE is in the CM_IDLE state and resource manager (RM)_(registered) REGISTERED state (that is, when registered, but no NAS signaling connection), the UE should:

initiate a service-request process in response to a paging of the network, unless the UE is in a mobile initiated connection only (MICO) mode;

initiate the service-request process if the UE has uplink signaling or data that needs to be sent; and when the UE and the signaling of the AN establishes a connection (RRC connection in a 3GPP access mode, UE-N3IWF connection in a non-3GPP mode), the UE enters the CM-CONNECTED state. The transmission of an initial NAS message (such as a registration request, a service request, or a deregistration Request), triggers a state conversion process of the UE from the CM-IDLE to the CM-CONNECTED.

If the UE is in the CM_IDLE state and the RM_REGIS-TERED state (that is, when registered, but no NAS signaling connection), the AMF should:

page the UE when the AMF has a signal or is called to send data to the UE.

When the N2 connection is established, the AMF enters the CM-CONNECTED state. Receiving an initial NAS message (Registration Request, Service Request or Deregistration Request) triggers a state conversion process of the AMF from the CM-IDLE to the CM-CONNECTED.

2.3. CM_CONNECTED State.

A NAS signaling connection is established between the UE in the CM_CONNECTED state and the corresponding AMF. When the UE is in the CM-CONNECTED state, the UE should:

enter the CM-IDLE state when an AN signaling connection is received (that is, RRC connection release (3GPP access) or UE-N3IWF connection release (non-3GPP access)).

When the UE is in the CM-CONNECTED state, the AMF should:

enter the CM_IDLE state when the NGAP signaling connection and the N3 user surface connection are released.

When a UE in the CM_CONNECTED state enters the RRC Inactive state:

the accessibility of the UE is managed by the access network;

the paging of the UE is managed by the access network; and the UE monitors a paging of a core network ID (such as 5G-S temporary mobile subscriber identity (5G-STMSI) and RAN-ID paging simultaneously.

3. Wake-Up Signal.

In LTE and NR systems, in order to achieve power saving, a wake-up signaling (such as a wake-up signaling (WUS)/downlink control information (DCI) scrambled through a power saving radio network temporary identity (PS-RNTI) for a cyclic redundancy check (CRC) (DCI with CRC scrambled by PS-RNTI, DCP)/a paging early indication (PEI)) is introduced in a connected state, an idle state, or an inactive state. The purpose is to enable the terminal to monitor the physical downlink control channel (PDCCH) from a dormant state (that is a DRX off state) (that is entering a DRX on state) as needed when configured with a DRX in a connected state or a DRX in an idle state.

For example, in the connected state, the terminal monitors a DCP signal sent by the network side in a monitor occasion to determine whether to return to the active state from the DRX off state, thus monitoring the PDCCH, and completing the corresponding connected state scheduling and data transmission. In the idle or inactive state, the terminal monitors a WUS message or a PEI message sent by the network side at a corresponding monitor occasion in each DRX cycle, thereby determining whether it is necessary to monitor a PDCCH and/or a physical downlink shared channel (PDSCH) message corresponding to paging messages in the subsequent one or more DRX cycles.

The method for controlling a state of a terminal provided in the embodiments of this application is described below through embodiments and application scenarios thereof with reference to the accompanying drawings.

As shown in FIG. 2, an embodiment of this application provides a method for controlling a state of a terminal, including:

Step 201: Trigger a terminal to enter a first state in a case that a first condition is met or a network indication is received, where power consumption of the terminal in the first state is less than power consumption of the terminal in a connected state, an idle state, or an inactive state; and the first condition is determined according to a protocol agreement, or the first condition is determined according to a network side configuration.

For example, in a unit time or the same time length, the power consumption of the terminal in the first state is less than the power consumption of the terminal in the connected state, the idle state, or the inactive state. Alternatively, in a unit time or the same time length, a power of the terminal in the first state is less than a power of the terminal in the connected state, the idle state, or the inactive state.

Here, a terminal state that is not used for a connected state, an idle state, or an inactive state is newly introduced, that is, the first state. The behavior performed by the terminal in the first state is different from the behavior performed by the terminal in the connected state, the idle state, or the inactive state, and the power consumption is relatively small, which is conducive to further power saving by the terminal.

The first state includes one of the following: a sleep state, a zero power state, an almost zero power ((AZP) or (Near Zero Power, NZP)) state, a low power (LP) state, an ultra low power ((ULP) or (Super Low Power, SLP)) state.

The first state may be a newly defined RRC state, that is, different from the three existing RRC states: the RRC connected state (RRC_CONNECTED), the RRC idle state (RRC_IDLE), and the RRC inactive state (RRC_INAC-TIVE), and is an RRC state other than the above three RRC states; or a sub-state of an existing RRC state, for example, a sub-state of the RRC idle state; or a newly defined core network state, that is, different from the existing core network connected state (such as a connection management CM_CONNECTED), the core network idle state (CM_IDLE), and is a core network state other than the core network connected state and the core network idle state.

Optionally, the first condition or the network indication includes at least one of the following:

1. A quality of receiving a signal is higher or lower than a certain threshold, or a quality change value of receiving a signal is higher or lower than a certain threshold, or the difference between the quality of receiving a signal and a reference value is higher or lower than a certain threshold. The quality of receiving a signal includes, but is not limited to, a reference signal received power (RSRP), a reference signal received quality (RSSI), a received signal strength indication (RSSI), a path loss (Path loss), or a signal to interference plus noise ratio (SINR). The foregoing thresholds may be preconfigured or predefined.

2. A mobility condition is met. The Mobility condition includes, but is not limited to, one or more of the following:

a. No cell-reselection occurs within a certain period of time; and b. A signal quality or a fluctuation range of the signal quality within a certain period of time is less than a threshold, where the signal quality includes, but is not limited to, RSRP, RSRQ, RSSI, Path loss or SINR.

3. No paging message or system information block (SIB) is received within a certain period of time.

4. Continuous residence in a non sleep state (such as an idle state or an inactive state) exceeds a preset duration.

In the embodiments of this application, since the power consumption of the terminal in the first state is less than the power consumption of the terminal in the connected state, the idle state, or the inactive state, in a case that the first condition is met or the network indication is received, after the terminal enters the first state, it is beneficial to the terminal to further save power, thereby achieving the objective of reducing the terminal power consumption.

Optionally, the terminal, when in the first state, executes a first behavior, and the first behavior includes at least one of the following:

closing a radio frequency (RF) module;

closing a base band module;

closing a functional module corresponding to a modem;

skipping receiving a reference signaling (RS);

skipping receiving system information (SI);

skipping monitoring a physical downlink control channel (PDCCH);

skipping receiving a paging message; or skipping performing radio resource management measurement (RRM measurement).

In this embodiment of this application, when the terminal is in the first state, the power consumption of the terminal can be further reduced by performing the foregoing first behavior.

Optionally, the first state belongs to at least one of the following:

a radio resource control RRC state of the terminal at a radio access network side; or a connection management (CM) state of the terminal at a CN side.

Optionally, in a case that the first state belongs to the RRC state, the first state is mapped to a CM idle state; or in a case that the first state belongs to the CM state, the first state is mapped to an RRC idle state; or in a case that the first state belongs to the RRC state and the CM state, the first state of the radio access network side is mapped to the first state of the core network side.

It should be noted that, the foregoing CM idle state is an idle state of the terminal defined by the core network side.

In a case that the first state belongs to the RRC state, the first state mapping to the CM idle state refers to a state synchronization between the UE and the core network as the CM idle state when the UE is in the first state at the access network side.

In a case that the first state belongs to the CM state, the first state mapping to the RRC idle state refers to a state synchronization between the UE and the access network side as the RRC idle state when the UE is in the first state at the core network side.

In a case that the first state belongs to the RRC state and the CM state, the first state of the radio access network side is mapped to the first state of the core network side, which refers to that when the first state of the terminal at the access network side is switched to the other RRC state, the state between the UE and the core network is synchronously switched to the corresponding state.

Optionally, in a case that the first state belongs to the RRC state, the first state is an RRC state other than a first RRC state, or the first state is a sub-state of an RRC idle state, where the first RRC state includes the RRC idle state, an RRC inactive state, and an RRC connected state.

Optionally, in a case that the first state is the RRC state other than the first RRC state, it is allowed that the first state and the first RRC state are switched to each other; or in a case that the first state is the sub-state of the RRC idle state, it is allowed that the first state and the RRC idle state are switched to each other; or in a case that the first state is the sub-state of the RRC idle state, direct switching between the first state and the first RRC state is not allowed.

Optionally, in a case that the first state is the RRC state other than the first RRC state, the terminal executes at least one of the following:

invalidating some or all of RAN configuration information in the RRC idle state;

maintaining some or all of core network configuration information in a CM idle state to continue to take effect; or maintaining registration information on a core network unchanged.

The invalidating some or all of RAN configuration information in the RRC idle state be understood as releasing some or all of the RAN configuration information in the RRC idle state when the terminal switches from the RRC idle state to the first state; and/or when the terminal switches back to the RRC idle state from the first state, some or all of the configuration information at the RAN side is retrieved.

The maintaining some or all of core network configuration information in a CM idle state to continue to take effect can be understood as when the terminal switches from the CM idle state to the first state, some or all of the core network side configuration information in the CM idle state continues to take effect; and/or when the terminal switches from the first state back to the CM idle state, some or all of the core network side configuration information continues to be used.

Optionally, in a case that the first state is the sub-state of the RRC idle state, the terminal executes at least one of the following:

maintaining configuration information in the idle state to continue to take effect; or maintaining registration information on a core network unchanged, where the configuration information in the idle state includes at least one of access network configuration information or core network configuration information.

The maintaining configuration information in the idle state to continue to take effect can be understood as not when the terminal switches from the idle state to the first state, the configuration information in the idle state is not released; and/or when the terminal switches from the first state back to the idle state, the configuration information in the idle state before entering the first state is used.

Optionally, in a case that the first state belongs to the RRC state and the CM state, some or all of configuration information of the terminal in the idle state takes no effect, where the configuration information of the terminal in the idle state includes at least one of access network configuration information or core network configuration information.

In a case that the first state belongs to the RRC state and the CM state, some or all of configuration information of the terminal in the idle state takes no effect, which can be understood as: configuration which is not stored by the terminal in the idle state, that is, some or all of the configuration takes no effect, that is, when the terminal switches from the idle state to the first state, some or all of the configuration in the idle state is released; and/or when the terminal switches from the first state back to the idle state, some or all of the configuration is retrieved.

Optionally, in a case that the first state belongs to the RRC state and the CM state, the first state of the radio access network side is an RRC state other than a first RRC state, and the first state of the core network side is a core network state other than a first core network state, where the first RRC state includes an RRC idle state, an RRC inactive state, and an RRC connected state, and the first core network state includes a CM idle state and a CM connected state.

Optionally, in a case that the first state belongs to the CM state, the first state is a core network state other than a first core network state, where the first core network state includes a CM idle state and a CM connected state. The CM connected state can also be described as a connected state at the core network side.

Optionally, it is allowed that the first state and the first core network state are switched to each other.

Optionally, in a case that the first state belongs to the CM state, the terminal executes at least one of the following:

maintaining RAN configuration information in an RRC idle state to continue to take effect;

maintaining configuration information at a RAN side to continue to take effect, that is maintaining configuration information at a RAN side unchanged; or invalidating some or all of core network side configuration information in a CM idle state.

The maintaining RAN configuration information in an RRC idle state to continue to take effect can be understood as: when the terminal switches from the CM_IDLE state to the first state, some or all of configuration at the RRC side in the RRC_IDLE state continues to take effect; and/or when the terminal switches from the first state back to the CM_IDLE state, some or all of the RAN side configuration is used.

The invalidating some or all of core network side configuration information in a CM idle state can be understood as: when the terminal switches from the CM_IDLE state to the first state, some or all of the CN side configuration in the CM_IDLE state is released; and/or when the terminal switches from the first state back to the CM_IDLE state, some or all of the CN side configuration is retrieved.

Optionally, the method in this embodiment of this application further includes:

releasing some or all of RRC configuration information in a case that the terminal switches from an RRC connected state to the first state; or releasing first configuration information in a case that the terminal switches from an RRC inactive state to the first state; or releasing second configuration information in a case that the terminal switches from an RRC idle state to the first state; or releasing some or all of non access stratum NAS related configuration information in a case that the terminal switches from an RRC connected state, an RRC inactive state, or an RRC idle state to the first state, where the first configuration information includes at least one of the following:

some or all of the RRC configuration information; or some or all of system messages;

the second configuration information includes at least one of the following:

some or all of RRC configuration information that takes effect in the idle state; or some or all of system messages; and the NAS related configuration information includes at least one of the following:

registration information;

discontinuous reception DRX configuration information; or tracking area TA related configuration information.

The method for controlling a state of a terminal in this application will be described in combination with embodiments.

Embodiment 1: The first state belongs to the state of the radio access network side, that is, an RRC state (assuming a sleep state) is newly introduced. The sleep state (RRC_SLEEP state) is juxtaposed with the RRC idle state (RRC_IDLE state), the RRC inactive state (RRC_INACTIVE state), or the RRC connected state (RRC_CONNECTED state).

As shown in FIG. 3, in this embodiment, the sleep state is mapped to the idle state at the core network side, that is, when the UE is in the RRC_SLEEP state at the access network RAN side, the state synchronization between the UE and the core network is in the CM_IDLE state. The terminal maintains the registration information on the core network unchanged.

Optionally, in this embodiment, the RRC state (such as an RRC_SLEEP state, an RRC_IDLE state, an RRC_INACTIVE state, and an RRC_CONNECTED state) of the terminal can be conditionally switched to each other, such as through RRC configuration, through RRC flow, or based on a timer/cycle, or based on a trigger condition.

Optionally, in this embodiment, some or all of the RAN side configuration stored by the terminal in the RRC_IDLE state takes no effect, that is, when the terminal switches from the RRC_IDLE state to the RRC_SLEEP state, some or all of the RAN side configuration in the RRC_IDLE state is released; and when the terminal switches from the RRC_SLEEP state back to the RRC_IDLE state, some or all of the RAN side configuration is retrieved.

Optionally, in this embodiment, some or all of the configuration stored by the terminal at the CN side in the CM_IDLE state continues to take effect (such as UE specific DRX, registration information, and the like), that is, when the terminal switches from the RRC_IDLE state to the RRC_SLEEP state, some or all of the CN side configuration in the CM_IDLE state continues to take effect; and when the terminal switches from the sleep state back to the idle state, some or all of the CN side configuration continues to be used.

Embodiment 2: The first state belongs to the state of the radio access network side, and the first state (such as the sleep state, that is, the RRC_SLEEP state) is a subordinate state of the RRC_IDLE state.

Figure 4:
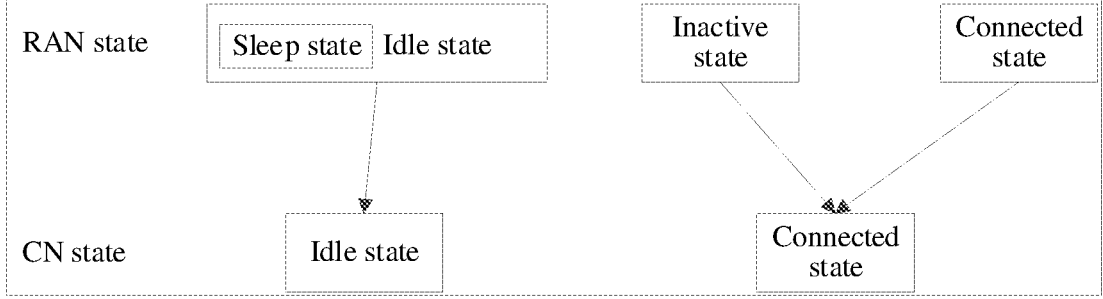
FIG. 4 is a schematic mapping diagram 2 of a first state according to an embodiment of this application.

As shown in FIG. 4, the sub-state in the RRC_IDLE state is mapped to the idle state of the core network, that is, when the UE is in the RRC_SLEEP state at the access network RAN side, the state synchronization between the UE and the core network is the CM_IDLE state. The terminal maintains the registration information on the core network unchanged.

Optionally, the configuration stored by the terminal in the idle state does not take no effect, that is, when the terminal switches from the idle state to the sleep state, the configuration in the idle state is not released; and when the terminal switches from the sleep state to the idle state, the configuration in the idle state before entering the sleep state is used.

The configuration in the idle state includes: RAN configuration and/or CN configuration.

Optionally, the RRC_SLEEP state and the RRC_IDLE state can be conditionally switched to each other, such as through RRC configuration, through RRC flow, or based on a timer/cycle, or based on a trigger condition.

Optionally, the RRC_SLEEP state and other RRC state (such as the RRC_IDLE state, the RRC_INACTIVE state, and the RRC_CONNECTED state) cannot be directly switched, and need to be switched between the RRC_IDLE state and other states.

Embodiment 3: The first state belongs to the state of the radio access network side, and belongs to the state of the core network side, that is, an RRC_SLEEP state is introduced at the radio access network side, and a CM_SLEEP state is introduced at the core network side.

Figure 5:
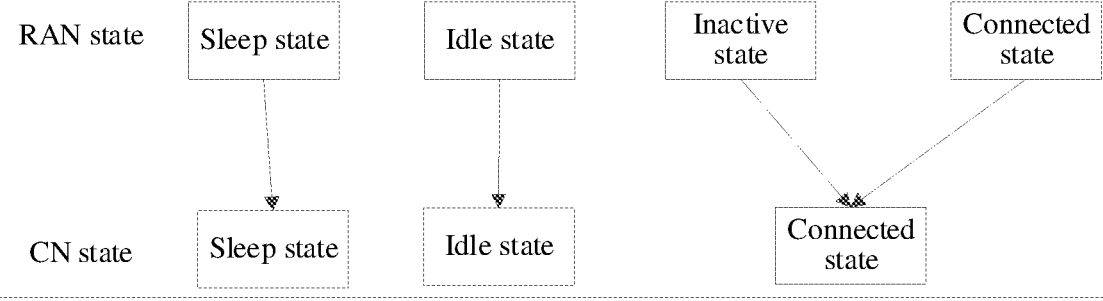
FIG. 5 is a schematic mapping diagram 3 of a first state according to an embodiment of this application.

As shown in FIG. 5, the RRC_SLEEP state is mapped to the CM_SLEEP state, that is, when the UE switches from the RRC_SLEEP state to other RRC states at the access network side, the state synchronization between the UE and the core network is switched to the corresponding state.

Optionally, in this embodiment, the RRC state (such as an RRC_SLEEP state, an RRC_IDLE state, an RRC_INACTIVE state, and an RRC_CONNECTED state) of the terminal can be conditionally switched to each other, such as through RRC configuration, through RRC flow, or based on a timer/cycle, or based on a trigger condition.

Optionally, in this embodiment, configuration which is not stored by the terminal in the idle state, that is, some or all of the configuration takes no effect, that is, when the terminal switches from the idle state to the sleep state, some or all of the configuration in the idle state is released; and/or when the terminal switches from the sleep state back to the idle state, some or all of the configuration is retrieved.

The configuration in the idle state includes: RAN configuration and/or CN configuration.

Embodiment 4: The first state belongs to the state of the core network side, that is, a CM_SLEEP state is introduced at the core network side.

Figure 6:
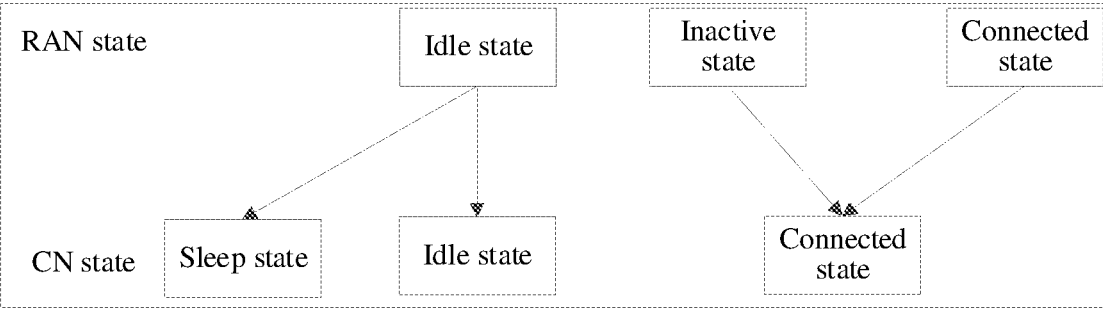
FIG. 6 is a schematic mapping diagram 4 of a first state according to an embodiment of this application.

As shown in FIG. 6, the CM_SLEEP state of the core network side is mapped to the RRC_IDLE state of the radio access network side, that is, when the UE is in the CM_SLEEP state at the core network side, the state synchronization between the UE and the RAN side is the RRC_IDLE state. The terminal maintains configure information at the RAN side unchanged.

Optionally, the terminal UE can convert between the CM_SLEEP state at the core network side and other states (that is, the CM_CONNECTED state), and at the same time, the state of the UE on the radio access network side is synchronously switched to the corresponding state. For example, through NAS configuration, through a NAS flow, RRC configuration, an RRC flow, or based on a timer/cycle, or based on a trigger condition.

Optionally, some or all of the core network side configuration stored by the terminal in the CM_IDLE state (such as UE specific DRX, registration information, TA information, and the like), that is, when the terminal switches from the CM_IDLE state to the CM_SLEEP state, some or all of the CN side configuration in the CM_IDLE state is released; and when the terminal switches from the CM_SLEEP state back to the CM_IDLE state, some or all of the CN side configuration is retrieved.

Optionally, some or all of the configuration stored by the terminal at the RAN side in the RRC_IDLE state continues to take effect, that is, when the terminal switches from the CM_IDLE state to the CM_SLEEP state, some or all of the configuration at the RRC side in the RRC_IDLE state continues to take effect; and when the terminal switches from the sleep state back to the idle state, some or all of the RAN side configuration continues to be used.

In the embodiments of this application, since the power consumption of the terminal in the first state is less than the power consumption of the terminal in the connected state, the idle state, or the inactive state, in a case that the first condition is met, after the terminal enters the first state, it is beneficial to the terminal to further save power, thereby achieving the objective of reducing the terminal power consumption.

It should be noted that, the method for controlling a state of a terminal provided by an embodiment of this application may be performed by an apparatus for controlling a state of a terminal, or a control module configured to perform the method for controlling a state of a terminal in the apparatus for controlling a state of a terminal. In the embodiment of this application, an example in which the apparatus for controlling a state of a terminal performs the method for controlling a state of a terminal is used for descriptions of the apparatus for controlling a state of a terminal.

Figure 7:
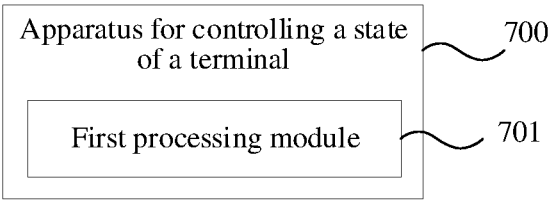
FIG. 7 is a schematic module diagram of an apparatus for controlling a state of a terminal according to an embodiment of this application.

As shown in FIG. 7, an apparatus for controlling a state of a terminal 700 is provided by an embodiment of this embodiment, including:

a first processing module 701, configured to trigger a terminal to enter a first state in a case that a first condition is met or a network indication is received, where power consumption of the terminal in the first state is less than power consumption of the terminal in a connected state, an idle state, or an inactive state; and the first condition is determined according to a protocol agreement, or the first condition is determined according to a network side configuration.

Optionally, the controlling apparatus in this embodiment of this application further includes: a first determining module, configured to determine whether a first condition is met.

Optionally, the terminal, when in the first state, executes a first behavior, and the first behavior includes at least one of the following:

closing a radio frequency module;

closing a base band module;

closing a functional module corresponding to a modem;

skipping receiving a reference signaling;

skipping receiving system information;

skipping monitoring a physical downlink control channel;

skipping receiving a paging message; or skipping performing radio resource management measurement.

Optionally, the first state belongs to at least one of the following:

a radio resource control RRC state of the terminal at a radio access network side; or a connection management CM state of the terminal at a core network side.

Optionally, in a case that the first state belongs to the RRC state, the first state is mapped to a CM idle state; or in a case that the first state belongs to the CM state, the first state is mapped to an RRC idle state; or in a case that the first state belongs to the RRC state and the CM state, the first state of the radio access network side is mapped to the first state of the core network side.

Optionally, in a case that the first state belongs to the RRC state, the first state is an RRC state other than a first RRC state, or the first state is a sub-state of an RRC idle state, where the first RRC state includes the RRC idle state, an RRC inactive state, and an RRC connected state.

Optionally, in a case that the first state is the RRC state other than the first RRC state, it is allowed that the first state and the first RRC state are switched to each other; or in a case that the first state is the sub-state of the RRC idle state, it is allowed that the first state and the RRC idle state are switched to each other; or in a case that the first state is the sub-state of the RRC idle state, direct switching between the first state and the first RRC state is not allowed.

Optionally, in a case that the first state is the RRC state other than the first RRC state, the terminal executes at least one of the following:

invalidating some or all of RAN configuration information in the RRC idle state;

maintaining some or all of core network configuration information in a CM idle state to continue to take effect; or maintaining registration information on a core network unchanged.

Optionally, in a case that the first state is the sub-state of the RRC idle state, the terminal executes at least one of the following:

maintaining configuration information in the idle state to continue to take effect; or maintaining registration information on a core network unchanged, where the configuration information in the idle state includes at least one of access network configuration information or core network configuration information.

Optionally, in a case that the first state belongs to the RRC state and the CM state, some or all of configuration information of the terminal in the idle state takes no effect, where the configuration information of the terminal in the idle state includes at least one of access network configuration information or core network configuration information.

Optionally, in a case that the first state belongs to the RRC state and the CM state, the first state of the radio access network side is an RRC state other than a first RRC state, and the first state of the core network side is a core network state other than a first core network state, where the first RRC state includes an RRC idle state, an RRC inactive state, and an RRC connected state, and the first core network state includes a CM idle state and a CM connected state.

Optionally, in a case that the first state belongs to the CM state, the first state is a core network state other than a first core network state, where the first core network state includes a CM idle state and a CM connected state.

Optionally, it is allowed that the first state and the first core network state are switched to each other.

Optionally, in a case that the first state belongs to the CM state, the terminal executes at least one of the following:

maintaining RAN configuration information in an RRC idle state to continue to take effect;

maintaining configuration information at a RAN side to continue to take effect; or invalidating some or all of core network side configuration information in a CM idle state.

Optionally, the apparatus of this embodiment of this application further includes:

a second processing module, configured to release some or all of RRC configuration information in a case that the terminal switches from an RRC connected state to the first state; or release first configuration information in a case that the terminal switches from an RRC inactive state to the first state; or release second configuration information in a case that the terminal switches from an RRC idle state to the first state; or release some or all of non access stratum NAS related configuration information in a case that the terminal switches from an RRC connected state, an RRC inactive state, or an RRC idle state to the first state, where the first configuration information includes at least one of the following:

some or all of the RRC configuration information; or some or all of system messages;

the second configuration information includes at least one of the following:

some or all of RRC configuration information that takes effect in the idle state; or some or all of system messages; and the NAS related configuration information includes at least one of the following:

registration information;

discontinuous reception DRX configuration information; or tracking area TA related configuration information.

In the embodiments of this application, since the power consumption of the terminal in the first state is less than the power consumption of the terminal in the connected state, the idle state, or the inactive state, in a case that the first condition is met or the network indication is received, after the terminal enters the first state, it is beneficial to the terminal to further save power, thereby achieving the objective of reducing the terminal power consumption.

The apparatus for controlling a state of a terminal in the embodiments of this application may be an apparatus, or may be a component, an integrated circuit, or a chip in a terminal. The apparatus may be a mobile terminal or may be a non mobile terminal. For example, the mobile terminal may include, but is not limited to, the types of terminal 11 listed above, and the non mobile terminal may be a server, a network attached storage (NAS), a personal computer (PC), a television (TV), a teller machine, or a self-service machine, and the like, and the embodiments of this application are not specifically limited.

The apparatus for controlling a state of a terminal in the embodiments of this application may be an apparatus having an operating system. The operating system may be Android operating system, an ios operating system, or other possible operating system. This embodiment of this application is not specifically limited.

The apparatus for controlling a state of a terminal provided in the embodiments of this application can implement all processes implemented by the method embodiments of FIG. 2 to FIG. 6, and the same technical effects are achieved. To avoid repetition, details are not described herein again.

Figure 8:
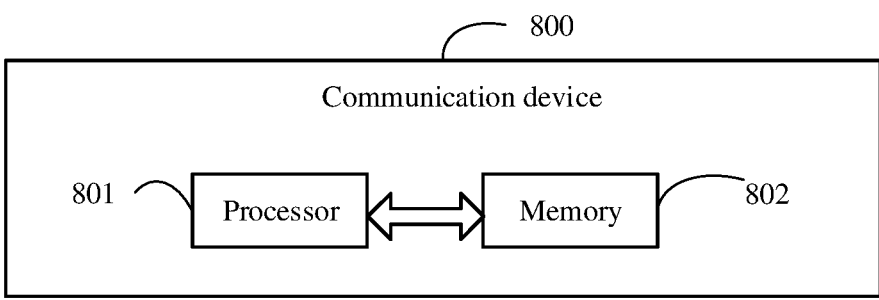
FIG. 8 is a structural block diagram of a communication device according to an embodiment of this application.

Optionally, as shown in FIG. 8, an embodiment of this application further provides a communication device 800, including a processor 801, a memory 802, and a program or instructions stored on the memory 802 and executable on the processor 801. For example, when the communication device 800 is a terminal, the program or the instructions, when executed by the processor 801, implements all processes of the foregoing method embodiments for controlling a state of a terminal, and can achieve the same technical effects. To avoid repetition, details are not described herein again.

Figure 9:
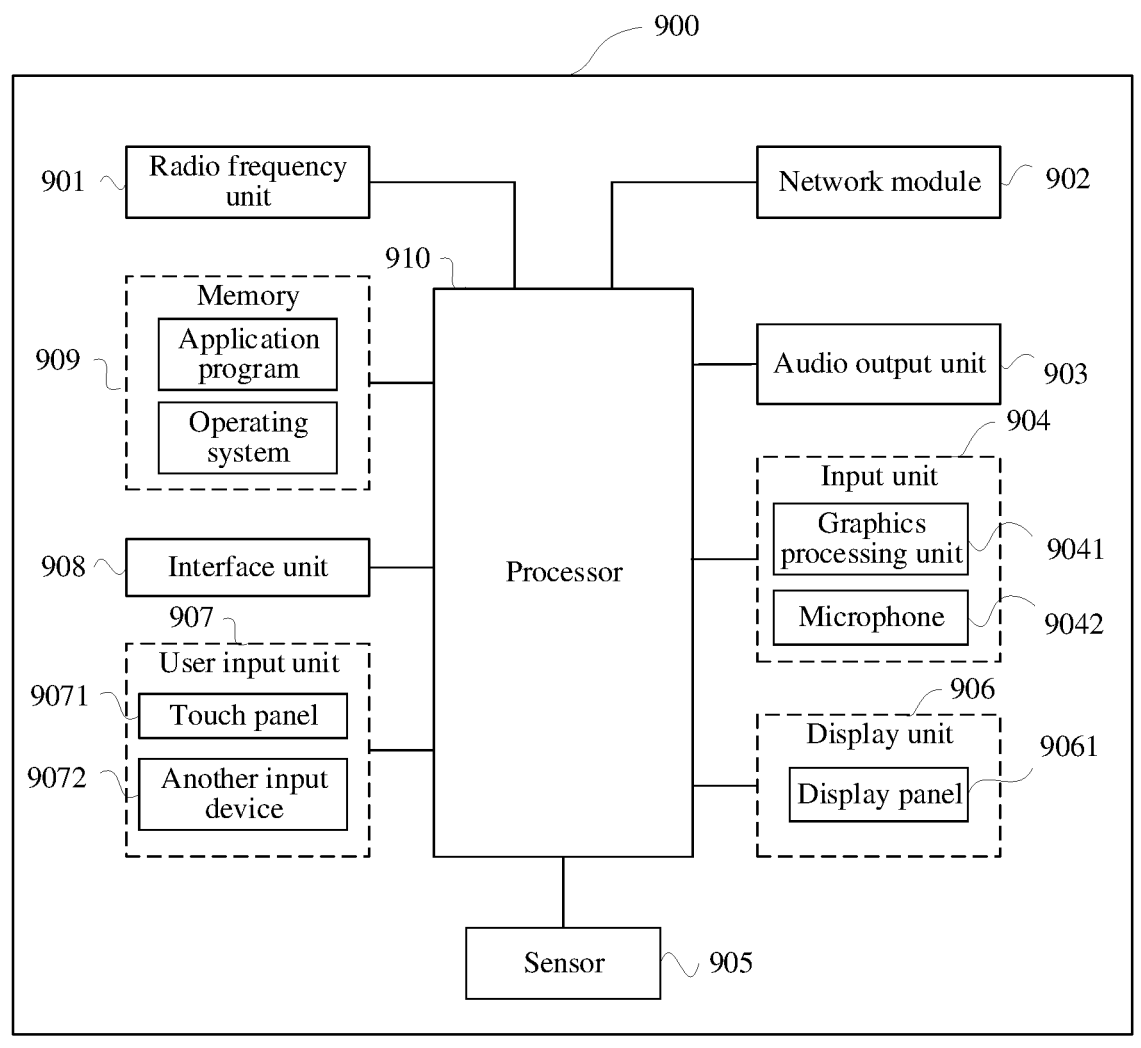
FIG. 9 is a structural block diagram of a terminal according to an embodiment of this application.

FIG. 9 is a schematic diagram of a hardware structure of a terminal that implements an embodiment of this application. The terminal 900 includes, but is not limited to: components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 further includes a power supply (such as a battery) for supplying power to the components. The power supply may logically connect to the processor 910 by using a power supply management system, thereby implementing functions, such as charging, discharging, and power consumption management, by using the power supply management system. A terminal structure shown in FIG. 9 does not constitute a limitation to the terminal, and the terminal may include more or fewer components than those shown in the figure, or some components may be combined, or a different component deployment may be used. Details are not described herein again.

It should be understood that, in this embodiment of this application, the input unit 904 may include a graphics processing unit (GPU) 9041 and a microphone 9042. The graphics processing unit 9041 performs processing on image data of a static picture or a video that is obtained by an image acquisition apparatus (for example, a camera) in a video acquisition mode or an image acquisition mode. The display unit 906 may include a display panel 9061, for example, the display panel 9061 may be configured in a form such as a liquid crystal display or an organic light-emitting diode. The user input unit 907 includes a touch panel 9071 and another input device 9072. The touch panel 9071 is also referred to as a touch screen. The touch panel 9071 may include two parts: a touch detection apparatus and a touch controller. The another input device 9072 may include, but is not limited to, a physical keyboard, a functional key (such as a volume control key or a switch key), a track ball, a mouse, and a joystick, and details are not described herein again.

In this embodiment of this application, the radio frequency unit 901 receives downlink data from a network side device and transmits downlink data to the processor 910 for processing. In addition, uplink data is transmitted to the network side device. Generally, the radio frequency unit 901 includes, but is not limited to, an antenna, at least one amplifier, a transceiver, a coupler, a low noise amplifier, a duplexer, and the like.

The memory 909 may be configured to store a software program or instruction and various data. The memory 909 may mainly include a program or instruction storage region and a data storage region. The program or instruction storage region may store an operating system, an application program or instruction required by at least one function (for example, a sound playback function and an image playback function), or the like. In addition, the memory 909 may include a high-speed random access memory and a non volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. For example, the nonvolatile memory may be at least one magnetic disk storage device, a flash memory device, or other volatile solid-state storage devices.

The processor 910 may include one or more processing units. Optionally, the processor 910 may integrate an application processor and a modem. The application processor mainly processes an operating system, a user interface, an application program or instruction, and the like. The modem mainly processes wireless communication, such as a baseband processor. It may be understood that the modem processor may not be integrated into the processor 910.

The processor 910 is configured to trigger a terminal to enter a first state in a case that a first condition is met or a network indication is received, where power consumption of the terminal in the first state is less than power consumption of the terminal in a connected state, an idle state, or an inactive state; and the first condition is determined according to a protocol agreement, or the first condition is determined according to a network side configuration.

Optionally, the terminal, when in the first state, executes a first behavior, and the first behavior includes at least one of the following:

closing a radio frequency module;
   closing a base band module;
   closing a functional module corresponding to a modem;
   skipping receiving a reference signaling;
   skipping receiving system information;
   skipping monitoring a physical downlink control channel;
   skipping receiving a paging message; or
   skipping performing radio resource management measurement.

Optionally, the first state belongs to at least one of the following:

a radio resource control RRC state of the terminal at a radio access network side; or
   a connection management CM state of the terminal at a core network side.

Optionally, in a case that the first state belongs to the RRC state, the first state is mapped to a CM idle state; or
   in a case that the first state belongs to the CM state, the first state is mapped to an RRC idle state; or
   in a case that the first state belongs to the RRC state and the CM state, the first state of the radio access network side is mapped to the first state of the core network side.

Optionally, in a case that the first state belongs to the RRC state, the first state is an RRC state other than a first RRC state, or the first state is a sub-state of an RRC idle state, where
   the first RRC state includes the RRC idle state, an RRC inactive state, and an RRC connected state.

Optionally, in a case that the first state is the RRC state other than the first RRC state, it is allowed that the first state and the first RRC state are switched to each other; or
   in a case that the first state is the sub-state of the RRC idle state, it is allowed that the first state and the RRC idle state are switched to each other; or
   in a case that the first state is the sub-state of the RRC idle state, direct switching between the first state and the first RRC state is not allowed.

Optionally, in a case that the first state is the RRC state other than the first RRC state, the terminal executes at least one of the following:
   invalidating some or all of RAN configuration information in the RRC idle state;

maintaining some or all of core network configuration information in a CM idle state to continue to take effect; or maintaining registration information on a core network unchanged.

Optionally, in a case that the first state is the sub-state of the RRC idle state, the terminal executes at least one of the following:

maintaining configuration information in the idle state to continue to take effect; or maintaining registration information on a core network unchanged, where the configuration information in the idle state includes at least one of access network configuration information or core network configuration information.

Optionally, in a case that the first state belongs to the RRC state and the CM state, some or all of configuration information of the terminal in the idle state takes no effect, where the configuration information of the terminal in the idle state includes at least one of access network configuration information or core network configuration information.

Optionally, in a case that the first state belongs to the RRC state and the CM state, the first state of the radio access network side is an RRC state other than a first RRC state, and the first state of the core network side is a core network state other than a first core network state, where the first RRC state includes an RRC idle state, an RRC inactive state, and an RRC connected state, and the first core network state includes a CM idle state and a CM connected state.

Optionally, in a case that the first state belongs to the CM state, the first state is a core network state other than a first core network state, where the first core network state includes a CM idle state and a CM connected state.

Optionally, it is allowed that the first state and the first core network state are switched to each other.

Optionally, in a case that the first state belongs to the CM state, the terminal executes at least one of the following:

maintaining RAN configuration information in an RRC idle state to continue to take effect;

maintaining configuration information at a RAN side to continue to take effect; or invalidating some or all of core network side configuration information in a CM idle state.

the processor 910 is further configured to:

release some or all of RRC configuration information in a case that the terminal switches from an RRC connected state to the first state; or release first configuration information in a case that the terminal switches from an RRC inactive state to the first state; or release second configuration information in a case that the terminal switches from an RRC idle state to the first state; or release some or all of non access stratum NAS related configuration information in a case that the terminal switches from an RRC connected state, an RRC inactive state, or an RRC idle state to the first state, where the first configuration information includes at least one of the following:

some or all of the RRC configuration information; or some or all of system messages;

the second configuration information includes at least one of the following:

some or all of RRC configuration information that takes effect in the idle state; or some or all of system messages; and the NAS related configuration information includes at least one of the following: registration information;

discontinuous reception DRX configuration information; or tracking area TA related configuration information.

For the terminal in the embodiments of this application, since the power consumption of the terminal in the first state is less than the power consumption of the terminal in the connected state, the idle state, or the inactive state, in a case that the first condition is met or the network indication is received, after the terminal enters the first state, it is beneficial to the terminal to further save power, thereby achieving the objective of reducing the terminal power consumption.

An embodiment of this application further provides a non-transitory readable storage medium, storing a program or instructions. The program or the instructions, when executed by a processor, implements all processes of the foregoing method embodiments for controlling a state of a terminal, and can achieve the same technical effects. To avoid repetition, details are not described herein again.

The processor is a processor in the terminal in the foregoing embodiments. The non-transitory readable storage medium includes a non-transitory computer-readable storage medium, for example, a read-only memory (ROM), a random access memory (RAM), a magnetic disk, or an optical disc.

An embodiment of this application further provides a chip, including a processor and a communication interface, where the communication interface is coupled to the processor, and the processor is configured to run a program or instructions, to implement all processes of the foregoing method embodiments for controlling a state of a terminal, and can achieve the same technical effects. To avoid repetition, details are not described herein again.

It should be understood that, the chip described in the embodiments of this application may also be referred to as a system-level chip, a system chip, a chip system, a system on chip, or the like.

An embodiment of this application further provides a computer program product, where the computer program product is stored in a non-volatile storage medium and executed by at least one processor to implement all processes of the foregoing method embodiments for controlling a state of a terminal, and can achieve the same technical effects. To avoid repetition, details are not described herein again.

It should be noted that, in this specification, "include", "comprise", and any variants are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses. In addition, it should be pointed out that the scope of the methods and apparatuses in the embodiments of this application is not limited to performing the functions in the order shown or discussed, but also can include performing the functions in basically the same way or in the opposite order according to the functions involved, for example, the described methods can be performed in a different order from the described ones, and various steps can also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the related technologies may be implemented in the form of a software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

A person of ordinary skill in the art may notice that the exemplary units and algorithm steps described with reference to the embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the related technology, all or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The storage medium includes: any medium that can store program code, such as a USB flash drive, a removable hard disk, a ROM, a RAM, a magnetic disk, or an optical disc.

A person skilled in the art may understand that all or some of the procedures of the methods of the foregoing embodiments may be implemented by a computer program controlling relevant hardware. The program may be stored in a computer-readable storage medium. When the program is executed, the procedures of the foregoing method embodiments may be implemented. The storage medium may be a magnetic disk, an optical disk, a ROM/RAM, and the like.

The embodiments of this application are described above with reference to the accompanying drawings, but this application is not limited to the foregoing specific embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. A method for controlling a state of a terminal, comprising:

triggering the terminal to enter a first state in a case that a first condition is met or a network indication is received, wherein power consumption of the terminal in the first state is less than power consumption of the terminal in a connected state, an idle state, or an inactive state; and the first condition is determined according to a protocol agreement, or the first condition is determined according to a network side configuration;

wherein the first state belongs to at least one of:

a radio resource control (RRC) state of the terminal at a radio access network (RAN) side; or a connection management (CM) state of the terminal at a core network side;

wherein in a case that the first state belongs to the RRC state, the first state is mapped to a CM idle state; or in a case that the first state belongs to the CM state, the first state is mapped to an RRC idle state; or in a case that the first state belongs to the RRC state and the CM state, the first state of the radio access network side is mapped to the first state of the core network side.

2. The method according to claim 1, wherein the terminal, when in the first state, executes a first behavior, and the first behavior comprises at least one of:

closing a radio frequency module;

closing a base band module;

closing a functional module corresponding to a modem;

skipping receiving a reference signaling;

skipping receiving system information;

skipping monitoring a physical downlink control channel;

skipping receiving a paging message; or skipping performing radio resource management measurement.

3. The method according to claim 1, wherein in a case that the first state belongs to the RRC state, the first state is an RRC state other than a first RRC state, or the first state is a sub-state of the RRC idle state, wherein the first RRC state comprises the RRC idle state, an RRC inactive state, and an RRC connected state.

4. The method according to claim 3, wherein in a case that the first state is the RRC state other than the first RRC state, it is allowed that the first state and the first RRC state are switched to each other; or in a case that the first state is the sub-state of the RRC idle state, it is allowed that the first state and the RRC idle state are switched to each other; or in a case that the first state is the sub-state of the RRC idle state, direct switching between the first state and the first RRC state is not allowed.

5. The method according to claim 3, wherein in a case that the first state is the RRC state other than the first RRC state, the terminal executes at least one of:

invalidating some or all of RAN configuration information in the RRC idle state;

maintaining some or all of core network configuration information in the CM idle state to continue taking effect; or maintaining registration information on a core network unchanged.

6. The method according to claim 3, wherein in a case that the first state is the sub-state of the RRC idle state, the terminal executes at least one of:

maintaining configuration information in the idle state to continue taking effect; or maintaining registration information on the core network unchanged, wherein the configuration information in the idle state comprises at least one of access network configuration information or core network configuration information.

7. The method according to claim 1, wherein in a case that the first state belongs to the RRC state and the CM state, some or all of configuration information of the terminal in the idle state takes no effect, wherein the configuration information of the terminal in the idle state comprises at least one of access network configuration information or core network configuration information.

8. The method according to claim 7, wherein in a case that the first state belongs to the RRC state and the CM state, the first state of the radio access network side is an RRC state other than a first RRC state, and the first state of the core network side is a core network state other than a first core network state, wherein the first RRC state comprises the RRC idle state, an RRC inactive state, and an RRC connected state, and the first core network state comprises the CM idle state and a CM connected state.

9. The method according to claim 1, wherein in a case that the first state belongs to the CM state, the first state is a core network state other than a first core network state, wherein the first core network state includes the CM idle state and a CM connected state.

10. The method according to claim 9, wherein it is allowed that the first state and the first core network state are switched to each other.

11. The method according to claim 1, wherein in a case that the first state belongs to the CM state, the terminal executes at least one of:

maintaining RAN configuration information in the RRC idle state to continue taking effect;

maintaining configuration information at the RAN side to continue taking effect;

or invalidating some or all of core network side configuration information in the CM idle state.

12. The method according to claim 1, wherein the method further comprises:

releasing some or all of RRC configuration information in a case that the terminal switches from an RRC connected state to the first state; or releasing first configuration information in a case that the terminal switches from an RRC inactive state to the first state; or releasing second configuration information in a case that the terminal switches from the RRC idle state to the first state; or releasing some or all of non access stratum (NAS) related configuration information in a case that the terminal switches from an RRC connected state, an RRC inactive state, or the RRC idle state to the first state, wherein the first configuration information includes at least one of:

some or all of the RRC configuration information; or some or all of system messages;

the second configuration information comprises at least one of:

some or all of RRC configuration information that takes effect in the idle state; or some or all of system messages; and the NAS related configuration information comprises at least one of:

registration information;

discontinuous reception (DRX) configuration information; or tracking area (TA) related configuration information.

13. A non-transitory readable storage medium, storing programs or instructions, wherein when the programs or the instructions are executed by a processor, steps of the method for controlling a state of the terminal according to claim 1 are implemented.

14. A terminal, comprising a processor, a memory, and programs or instructions stored on the memory and executable on the processor, wherein the programs or the instructions, when executed by the processor, cause the terminal to perform:

triggering the terminal to enter a first state in a case that a first condition is met or a network indication is received, wherein power consumption of the terminal in the first state is less than power consumption of the terminal in a connected state, an idle state, or an inactive state; and the first condition is determined according to a protocol agreement, or the first condition is determined according to a network side configuration;

wherein the first state belongs to at least one of:

a radio resource control (RRC) state of the terminal at a radio access network (RAN) side; or a connection management (CM) state of the terminal at a core network side;

wherein in a case that the first state belongs to the RRC state, the first state is mapped to a CM idle state; or in a case that the first state belongs to the CM state, the first state is mapped to an RRC idle state; or in a case that the first state belongs to the RRC state and the CM state, the first state of the radio access network side is mapped to the first state of the core network side.

15. The terminal according to claim 14, wherein the programs or the instructions, when executed by the processor, cause the terminal, when in the first state, to execute a first behavior, and the first behavior comprises at least one of:

closing a radio frequency module;

closing a base band module;

closing a functional module corresponding to a modem;

skipping receiving a reference signaling;

skipping receiving system information;

skipping monitoring a physical downlink control channel;

skipping receiving a paging message; or skipping performing radio resource management measurement.

16. The terminal according to claim 14, wherein in a case that the first state belongs to the RRC state, the first state is an RRC state other than a first RRC state, or the first state is a sub-state of the RRC idle state, wherein the first RRC state comprises the RRC idle state, an RRC inactive state, and an RRC connected state.

* * * * *